United States Patent [19]

Popov et al.

[11] 4,258,278
[45] Mar. 24, 1981

[54] LINEAR INDUCTION MOTOR

[76] Inventors: Alexandr D. Popov, prospekt Koroleva, 12, kv. 154; Vladimir A. Solomin, ulitsa Dachnaya, 14, kv. 31; Vladimir M. Mindin, prospekt Voroshilovsky, 50, kv. 165, all of Rostov-na-Donu, U.S.S.R.

[21] Appl. No.: 87,955

[22] Filed: Oct. 24, 1979

[30] Foreign Application Priority Data

Mar. 21, 1979 [SU] U.S.S.R. ............... 2733300

[51] Int. Cl.³ ............................................. H02K 41/00
[52] U.S. Cl. ..................................................... 310/13
[58] Field of Search ..................................... 310/12–19

[56] References Cited
U.S. PATENT DOCUMENTS

| | | | |
|---|---|---|---|
| 3,585,423 | 6/1971 | Bolton et al. | 310/13 |
| 3,628,072 | 12/1971 | Nicholson | 310/13 |
| 3,644,762 | 2/1972 | Eastham | 310/13 |
| 3,761,747 | 9/1973 | Allaigre | 310/13 |
| 3,770,995 | 11/1973 | Eastham et al. | 310/13 X |
| 3,836,799 | 9/1974 | Eastham et al. | 310/13 |

*Primary Examiner*—Donovan F. Duggan
*Attorney, Agent, or Firm*—Haseltine and Lake

[57] ABSTRACT

A linear induction motor comprises a current-conducting secondary element of a U-shaped cross-section, accommodating an inductor. The inductor has laminated U-shaped and E-shaped cores carrying a polyphase winding. Each E-shaped core is arranged between two U-shaped cores. The polyphase winding comprises two parts each coil of which encompasses respective outermost legs of E-shaped cores and respective yokes of the U-shaped cores which are juxtaposed to said outermost legs.

1 Claim, 2 Drawing Figures

LINEAR INDUCTION MOTOR

FIELD OF THE INVENTION

The present invention relates to electric machines and in particular to linear induction motors.

A linear induction motor is intended to be used as a traction motor for high-speed ground transportation means, and may also be used in conveyors and in various electric drives with rectilinear or reciprocating motion of working members.

BACKGROUND OF THE INVENTION

Known in the art is a linear induction motor (cf. French Pat. No. 1,537,842, Cl. H02K, 1968), comprising a current-conducting secondary element of U-shaped cross-section, having laminated cores carrying polyphase windings. Used as laminated cores are longitudinally laminated cores provided with slots receiving polyphase windings.

However, in this prior art electric motor each core has its own polyphase winding which complicates its construction.

SUMMARY OF THE INVENTION

It is an object of the present invention to provide a linear induction motor of a simpler construction.

This object is accomplished by that in a linear induction motor comprising a current-conducting secondary element of a U-shaped cross-section, accommodating an inductor having laminated cores carrying polyphase windings in accordance with the invention the laminated cores are made U-shaped and E-shaped, each E-shaped core being arranged between two U-shaped cores which by their yokes adjoin outermost legs of E-shaped cores, whereas the polyphase windings is made up of two parts with the coils of each part disposed symmetrically with respect to the longitudinal axis of the current-conducting secondary element and encompassing respective outermost legs of the E-shaped cores and respective yokes of the U-shaped cores which are justaposed to said encompassed outer most legs.

The present invention makes it possible to use a smaller number of polyphase windings which substantially simplifies the construction of the linear induction motor.

BRIEF DESCRIPTION OF THE DRAWINGS

Other objects and advantages of the present invention will be clear from the following description of a specific embodiment thereof taken in conjunction with the accompanying drawings in which.

DETAILED DESCRIPTION OF THE INVENTION

Figures 1, 2:
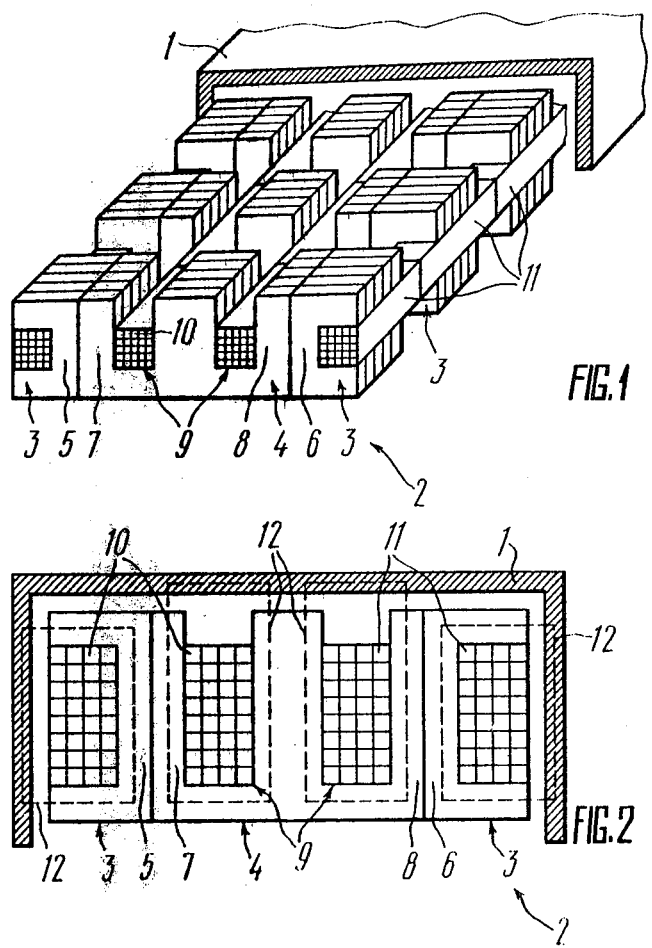
FIG. 1 illustrates a general view of a linear induction motor in accordance with the invention.
FIG. 2 shows a cross-section of a linear induction motor in accordance with the invention.

The linear induction motor of the invention (FIG. 1) comprises a current-conducting secondary element of U-shaped cross-section, disposed inside of which is an inductor 2 having laminated U-shaped cores 3 and E-shaped cores 4. Each E-shaped core 4 is arranged between two U-shaped cores 3 which by their yokes 5 and 6 adjoin respective outermost legs 7, 8 of the E-shaped cores 4.

Each polyphase winding 9 is made up of two parts, coils 10 of the first part of the polyphase winding 9 encompassing the outermost legs 7 of the E-shaped cores 4 and the yokes 5, adjoining said legs 7, of the U-shaped cores 3, whereas coils 11 of the second part of the polyphase winding being disposed symmetrically to the coils 10 and encompassing the outermost legs 8 of the E-shaped cores 4 and the yokes 6 of the U-shaped cores 3 which are juxtaposed to said legs 8.

The linear induction motor of the invention operates as described hereinafter.

Upon connection of the coils 10 and 11 (FIG. 1) of the polyphase winding 9 to a three-phase voltage source (not shown), a magnetic field is induced which travels in a longitudinal direction and components of which close in a transverse direction over a closing line 12 shown in FIG. 2 by a dashed line.

The travelling magnetic field of the inductor 2 (FIGS. 1,2) while crossing the current-conducting secondary element 1 induces electro-motive forces therein which cause a flow of three-phase eddy currents in the secondary element 1. The eddy currents of the element 1 start interacting with the travelling magnetic field of the inductor 2. Due to this interaction a tractive effort and normal forces of the electric motor are developed. Under the action of the tractive force the element 1 starts to move in the direction of the magnetic field travel and under the action of the force normal to a horizontal face of the element 1 said element levitates in the magnetic field of the electric motor. The forces normal to the vertical faces of the element 1 in this case will be directed to the opposite sides thereby stabilizing the secondary element 2 with respect to the inductor 2.

What is claimed is:

1. A linear induction motor comprising:
    a current-conducting secondary element having a longitudinal axis and being U-shaped in cross-section;
    an inductor disposed inside said current-conducting secondary element;
    laminated U-shaped cores of said inductor, each having a yoke, said cores being disposed in two rows so that said yokes of said laminated U-shaped cores of said first row face said yokes of said laminated U-shaped cores of said second row;
    laminated E-shaped cores of said inductor, each having two outermost legs and being disposed between respective ones of said laminated U-shaped cores of said first row and second rows so that they directly adjoin by their outermost legs to the yokes of said laminated U-shaped cores;
    polyphase windings of said inductor made up of two parts each having coils disposed symmetrically relative to said longitudinal axis of said current-conducting element and encompassing respective outermost legs of said laminated E-shaped cores and respective yokes of said laminated U-shaped cores which are juxtaposed to the outermost legs.

* * * * *